Jan. 24, 1961 W. W. LOOSE 2,969,239

PHONOGRAPH APPARATUS

Filed May 23, 1955 3 Sheets-Sheet 1

INVENTOR.
WINFIELD W. LOOSE
BY
Carl H. Lynnadvedt
AGENT

INVENTOR.
WINFIELD W. LOOSE
BY
Carl H. Synnestvedt
AGENT

Jan. 24, 1961

W. W. LOOSE 2,969,239

PHONOGRAPH APPARATUS

Filed May 23, 1955

3 Sheets-Sheet 3

INVENTOR.
WINFIELD W. LOOSE
BY
Carl H. Synnestvedt
AGENT

United States Patent Office 2,969,239

Patented Jan. 24, 1961

2,969,239

PHONOGRAPH APPARATUS

Winfield W. Loose, Reading, Pa., assignor to Philco Corporation, Philadelphia, Pa., a corporation of Pennsylvania Filed May 23, 1955, Ser. No. 510,250

1 Claim. (Cl. 274—10)

Figure 1:
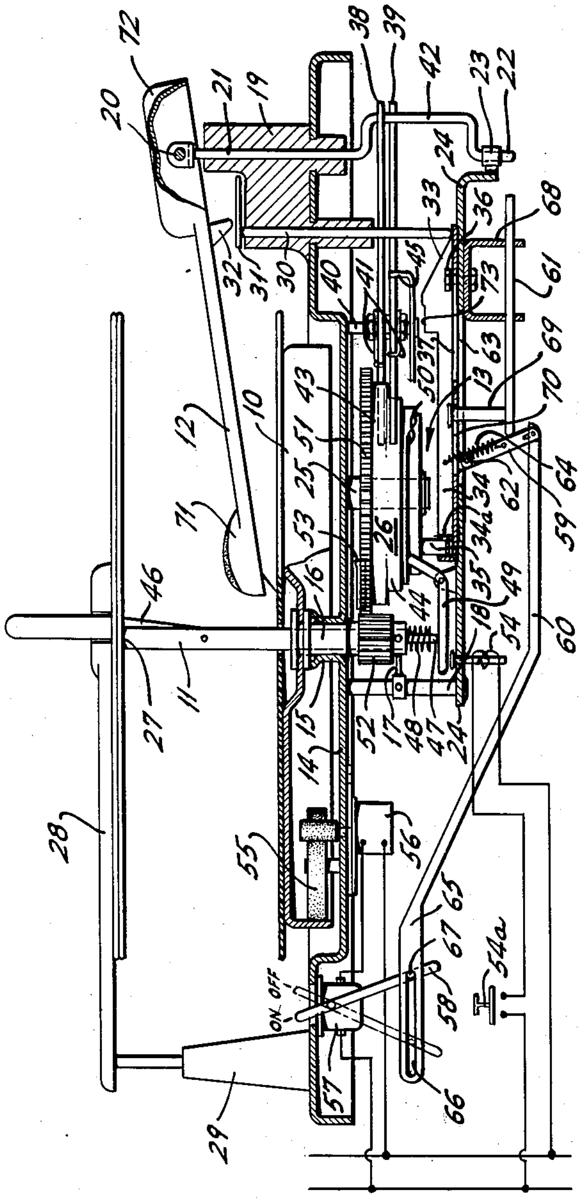

The present invention relates generally to phonograph apparatus and particularly to automatic record-changing phonographs in which records are suspended above the turntable and are successively dropped to playing position on the turntable. More specifically, the invention herein disclosed and claimed has to do with an automatic phonograph of the above mentioned variety in which provision is made for automatically stopping the operation of the phonograph after the last record has been played.

Automatic record-changing phonographs having an automatic shut-off arrangement which employs an existing phonograph element, such as the record supporting spindle or the record hold-down member, to control the shut-off operation are well known. These known automatic phonographs usually require a complicated record-changing mechanism capable of modifying its normal operation during a record-changing cycle following the discharge and playing of the last record, so as to effect deenergization of the motor which drives the phonograph.

It is the object of the present invention to provide a phonograph incorporating an automatic shut-off arrangement which is adapted for novel association with elements of the phonograph and which is constructed and operated in an improved and simplified manner. The arrangement of this invention makes it possible to obtain automatic shut-off without altering the regular function of the record-changing mechanism.

It is also the object of the invention to provide a phonograph constructed in such a manner that automatic shut-off is accomplished through the intermediary of a simple linkage system adapted to be readily associated with existing parts of the phonograph.

A characteristic feature of the invention resides in the provision of a phonograph having an automatic shut-off arrangement in which the tone-arm functions in a novel manner to serve as a feeler for detecting the presence or absence of a record to be played and to serve as the main control for effecting deenergization of the phonograph motor when the playing of a record has been completed and no additional record remains to be played.

Broadly stated and in accordance with the present invention, the above noted objects and features are achieved by means of an automatic phonograph which comprises mechanism for vertically moving the tone-arm in an unusual manner during a record-changing cycle. This mechanism includes driven instrumentalities devised to lift the tone-arm so that a portion thereof is raised to a predetermined uppermost position which is above the level at which the lowermost disk record is normally suspended. In moving toward this uppermost position, said portion of the tone-arm travels in a path which is within the diametral boundary of a suspended disk record and transverse to the plane thereof, so that said portion is stopped short of said position whenever a record is interposed in said path. The tone-arm is associated with means for bringing about a condition of operation in which the phonograph continues to function when the tone-arm is prevented from reaching its uppermost position because of the presence of a supported record, and for bringing about a different condition of operation in which the phonograph ceases to function when the tone-arm is free to reach its uppermost position in the absence of a supported record, that is to say when no additional record remains to be played.

According to a specific embodiment of the invention, the above-mentioned instrumentalities include a linkage system connected with the cycling mechanism and with the switching control of the motor which drives the phonograph, and the tone-arm assembly includes means for displacing said linkage system to a position to actuate said control and to deenergize said motor when said mechanism has completed its cycle following the playing of the last record.

Figure 2:
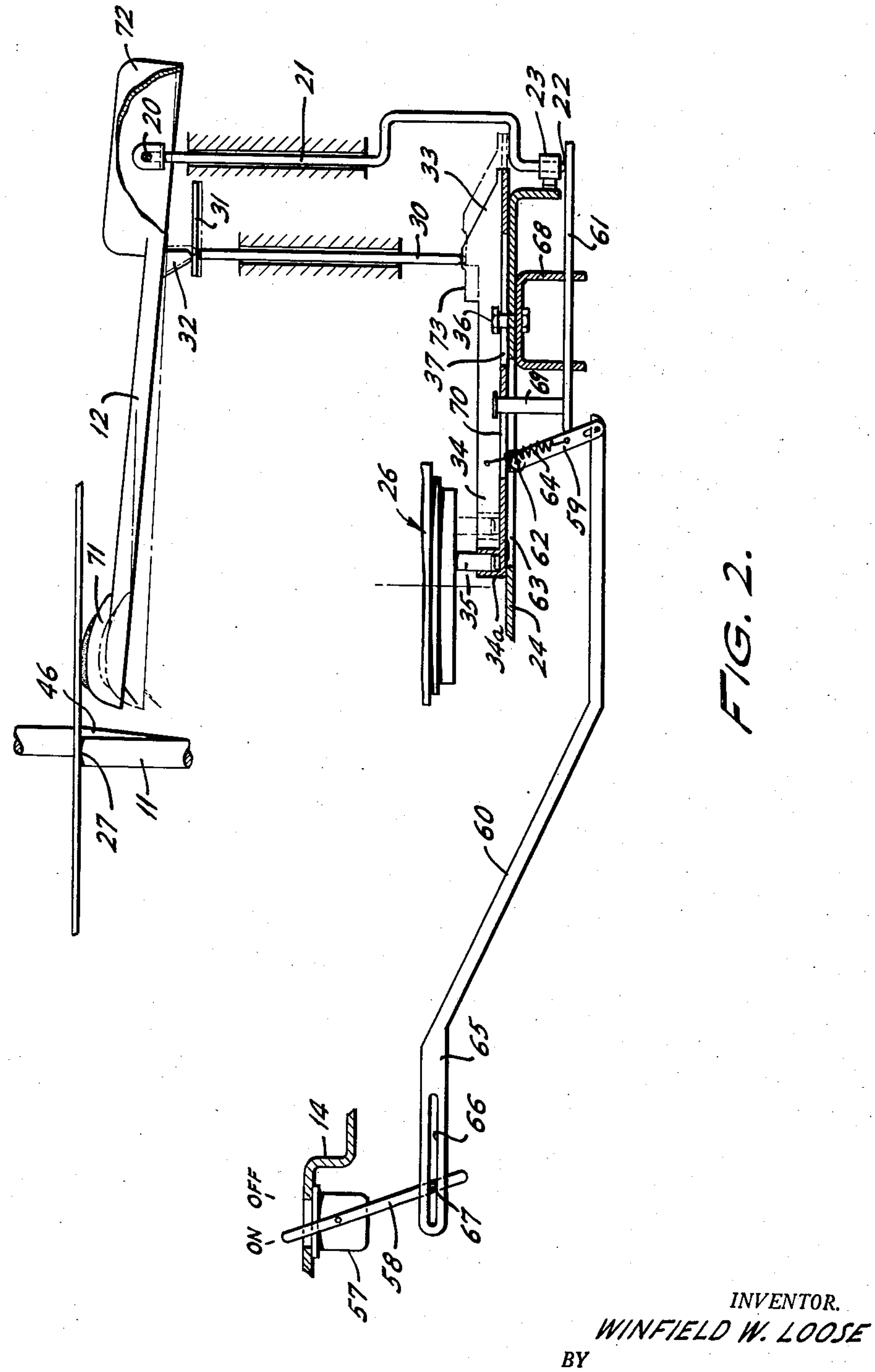
Figure 3:
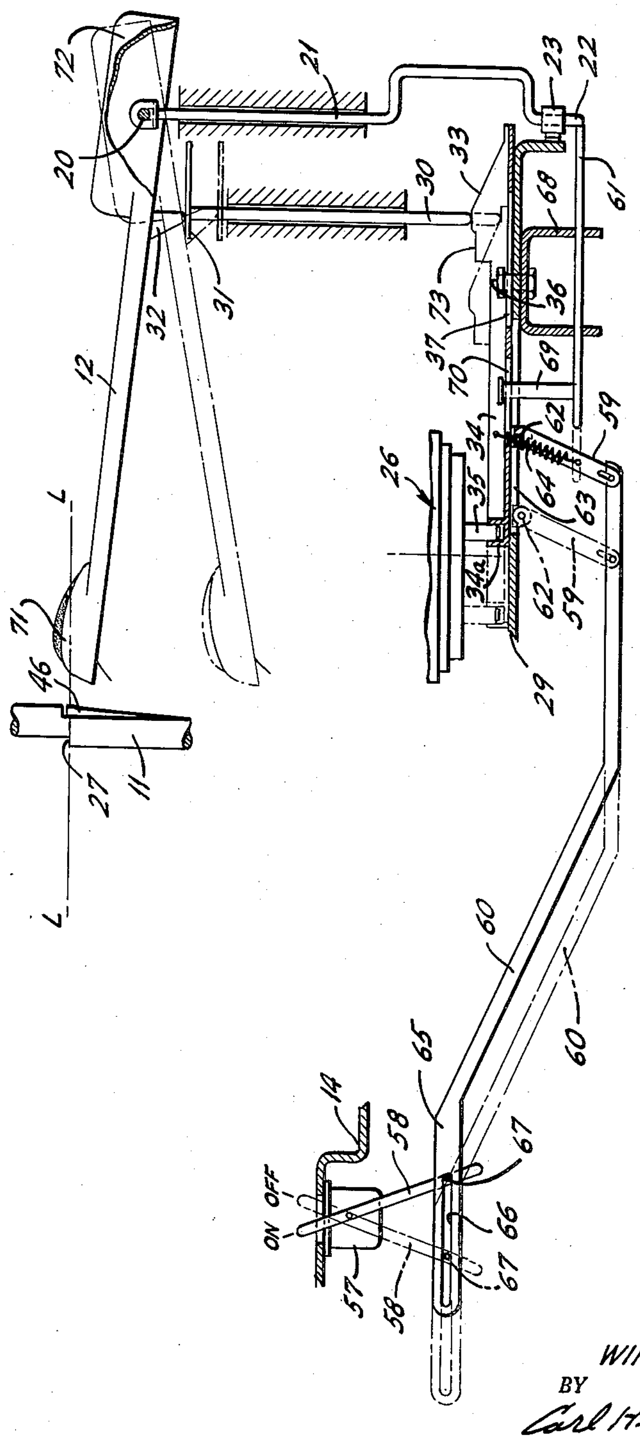

The full nature of the invention and the manner in which the above-mentioned and other objects and features are realized will be more fully understood from the following description taken in conjunction with the accompanying drawings, in which:

Figure 1 is a side view, partly in elevation and partly in section, of an automatic phonograph embodying the invention and illustrating the parts in the position they occupy during the playing of a record;

Figure 2 is an enlarged fragmentary view of portions of the phonograph shown in Figure 1 and illustrating the tone-arm and certain associated parts in one of their positions during operation of the record-changing mechanism when a stack of records or, at least, one record is present on the record supporting structure; and Figure 3 is a view similar to Figure 2 but illustrates the tone-arm and certain associated parts in one of their positions during operation of the record-changing mechanism when no record is present on the supporting structure.

With more particular reference to the drawings, Figure 1 illustrates an automatic phonograph including a turntable 10, a vertically extended spindle 11, a tone-arm 12, and a record-changing mechanism, designated generally at 13.

In the illustrated structure, a base plate 14 serves to carry the various parts and is provided with a suitable bearing 15 to receive the hub 16 of the turntable and to support the latter for rotation about the vertically extended spindle 11. This spindle is conveniently held in fixed position by means of a bracket 17 secured to a post 18 depending from the base plate, said bracket advantageously serving as a thrust bearing for the lower extremity of the turntable hub. The base plate is also provided with a suitable pillar 19 to mount the tone-arm 12 for its various movements. As seen in Figure 1, the tone-arm is connected by means of a horizontal pivot 20 to a vertical shaft 21 extending through and rotatable within a bore which is formed in said pillar and provides an upper bearing for said shaft. This shaft is provided with an extended end portion 22 projecting through and rotatably retained in a lower bearing 23 carried by a bridge 24 which is suspended from the base plate 14 by means of posts, such as the one illustrated at 18. This arrangement permits the tone-arm to swing vertically and horizontally, this is to say, in directions both perpendicular and parallel to the record-supporting surface of the turntable. The base plate 14 is moreover provided with an arbor 25 rotatably mounting a cycling cam 26 which is included in the record-changing mechanism and constitutes its controlling element.

As is customary, the spindle 11 projects upwardly from the surface of the turntable and is formed with a shoulder 27 for supporting the records to be played. A stabilizing arm 28 of usual construction and movably mounted in a suitable standard 29, is provided for placement on top of the supported records to insure their retention on said shoulder of the spindle. This shoulder is disposed to support the records in a predetermined elevated position with respect to the top surface of the turntable so that part of the vertical and horizontal movements of the tone-arm takes place within the space between the turntable (or the top of a stack of a certain predetermined number of records deposited on the turntable) and the record resting directly on said shoulder of the spindle.

Vertical movement of the tone-arm is accomplished by the action of a rod 30 having a platform 31 arranged to engage a rigid projection 32 depending from the tone-arm adjacent its pivot 20. The rod 30 is conveniently mounted for vertical motion in a side extension of the pillar 19 and projects downwardly for engagement with an inclined portion 33 at the leading end of a slide 34 supported on the bridge 24. This slide is connected with a pin 35 which is carried by the cycling cam 26 and disposed eccentrically with respect to its axis of rotation. Thus, rotation of the cycling cam reciprocates the slide 34 which causes the rod 30 to ride up and down the inclined portion 33 to provide for lifting and lowering of the tone-arm. The slide 34 is advantageously guided in its reciprocating motion by means of a pin or bolt 36 affixed on the bridge 24 and freely fitted in a slot 37 which is elongated to permit unobstructed reciprocative movement of said slide. In practice, the slide 34 preferably includes a right angularly disposed elongated channel section 34*a* in which the eccentrically arranged pin 35 is slidably received, so that the rotary motion of the cycling cam advantageously transmits a rectilinear motion to said slide.

Horizontal swinging movement of the tone-arm occurs while the latter is in lifted position and is obtained by function of a pair of levers 38 and 39 mounted at their intermediate portions to swing about a pivot 40 on the base plate 14. Suitable spring means 41 resiliently act on said levers to maintain one of their end portions in engagement with the cycling cam 26 which is adapted to actuate said levers to bring the other end portions thereof in engagement with an intermediate portion of the tone-arm mounting shaft 21. This later portion of said mounting shaft is formed in the shape of a crank 42 which is angularly displaced in accordance with the angular displacement of the tone-arm in the playing of a record and, as shown in Figure 1 of drawings, one of said levers is arranged to extend over one side of said crank, whereas the other of said levers is arranged to extend over the opposite side of said crank. Also as shown in Figure 1, one of said levers, namely the lever 38, engages a first cam track 43 provided on the periphery of the cycling cam 26, whereas the other of said levers, namely the lever 39, engages a second cam track 44 also provided on the periphery of the cycling cam.

In the arrangement as shown in Figure 1, the inward horizontal movement of the tone-arm during the playing of a record, is in a direction away from the viewer so that the angular displacement of the crank 42 is in the opposite direction, that is toward the viewer. With that arrangement, the first cam track 43 is designed to maintain the lever 38 in an inactive position away from the crank 42 so as not to interfere with said angular displacement during playing of a record. This first cam track 43 is further so designed that, during a record-changing cycle, it moves the lever 38 in contact with the adjacent side of the crank and displaces the latter to swing the tone-arm horizontally from an inner position over the turntable and the records thereon, to an outer position at the side of the turntable and clear of the records. Moreover, the cam track 43 is such that, after the tone-arm has reached said outer position, the lever 38 is returned to its above-mentioned inactive position, by the time the record-changing cycle is completed.

With the above-mentioned arrangement, the second cam track 44 is designed to maintain the lever 39 in an inactive position which allows the aforesaid outer movement of the tone-arm. This second cam track is further so designed that, after the tone-arm has reached its outer position, said track moves the lever 39 in contact with the adjacent side of the crank 42 and swings the tone-arm inwardly to starting position for playing engagement with the starting groove of the record to be played. Suitable means including an adjustable stop 45 is associated with the lever 39 to control this last movement of the tone-arm so as to obtain automatic setting of said tone-arm in proper starting position with respect to records of different diameters. It will be understood that, in practice, the stop 45 is connected in the customary manner to a conventional adjusting device (not shown) which is usually provided in a readily accessible location on the phonograph.

As hereinbefore stated, the spindle 11 supports records above the turntable and, in the illustrated embodiment, this spindle is of the well-known type including a pivotal finger 46 adapted to dislodge the lowermost supported record so that it slips off the shoulder 27 of said spindle and becomes free to fall along the elongated shank of the latter. As is customary, the finger 46 is actuated by means of a rod or plunger 47 slidably enclosed within said shank of the spindle and protruding from the lower extremity thereof. A spring 48 urges said plunger downwardly and holds the protruding end thereof in contact with one end portion of a lever 49 pivotally mounted on the bridge 24. The other end portion of the lever 49 is maintained, by action of said spring, in riding engagement with a camming edge 50 on the cycling cam 26 so that upon rotation of the latter, said lever is rocked to move the plunger 47 for actuation of finger 46.

As was previously indicated, the record-changing cycle is controlled by rotation of the cycling cam 26. To provide for this rotation, the cycling cam includes a gear 51 which, according to conventional practice, is adapted to be driven by engagement with a pinion 52 rigid with the turntable hub 16. This gear 51 is provided with the usual gap so that the cycling cam remains idle so long as said gap confronts said pinion. A conventional toothed segment 53 is mounted on the gear 51 to close said gap thereby activating the cycling cam and initiating a record-changing cycle which continues for a complete revolution of said cam.

Actuation of the segment 53 is obtained by function of any suitable known means (not shown) including the customary trip mechanism associated with the tone-arm so as to provide for initiation of a record-changing cycle when the tone-arm reaches the end of a record being played. It will be understood that this trip mechanism may also be associated in the customary manner with the usual manually operable reject button (not shown) for changing records whenever desired. The release of the first record may be conveniently accomplished by other means, such as the one which is represented in Figure 1 and in which a separate arrangement including a solenoid 54 energized by operation of a push button 54*a*, functions to actuate the plunger 47 of the record releasing finger 46.

It will be understood that during the entire time the phonograph is in use, the turntable 10 continues to rotate being driven by means of the usual driving assembly including an idler 55 frictionally engaging the rim of the turntable and operatively associated with an electric motor 56. As represented in Figure 1, the motor is electrically connected with a switch 57 for controlling the energization of said motor in response to placement of a switching actuator 58 in "On" or "Off" position. This switch actuator is disposed for manual placement to "On" and "Off" positions, however, the phonograph incorporates instrumentalities whereby said actuator is mechanically shifted from "On" to "Off" position so that the phonograph automatically ceases its operation following the playing of the last record. These instrumentalities include an arm 59, a rigid link 60, and a rigid displaceable member 61.

The arm 59 is hinged at one end to a pivot 62 affixed to the slide 34, and an elongated slot 63 is provided in the bridge 24 to allow said arm and its pivot to follow the reciprocating movement of the slide. A spring 64 is connected to the slide 34 and to the arm 59 and is disposed off-center with respect to the pivot 62, to urge and yieldably maintain said arm either in a position to the right of said pivot as seen in Figures 1 and 2 or in a position to the left of said pivot as seen in Figure 3.

The link 60 provides a connection between the arm 59 and the switch actuator 58. For that purpose, said link 60 is hinged to the free end portion of said arm and has a portion 65 slidably connected with said switch actuator by means of an elongated slot 66 which receives a projection 67 on said switch actuator.

The displaceable member 61 is slidably supported in line with the arm 59 and with the projecting end portion 22 of the tone-arm mounting shaft 21, as by means of a bracket 68 on the bridge 24. This member 61 is provided with a rigid extension 69 passing through the slot 63 in the base plate and through a corresponding slot 70 in the slide 34.

During the playing of a record, the above-mentioned instrumentalities rest in the position shown in Figure 1. In this position, the part of the slide 34 at the extreme right end of the elongated slot 70 as viewed in said Figure 1, contacts the extension 69 of the displaceable member 61 and holds said member against the arm 59 and away from the projecting lower end portion 22 of the tone-arm mounting shaft. Also, in the position shown in Figure 1, the elongated slot 66 in the link portion 65 is so disposed with respect to the projection 67 of the switch actuator 58 that the latter may be manually moved from "Off" to "On" position as well as from "On to "Off" position.

The operative function of the arm 59, link 60 and member 61, is under control of the lifting movement of the tone-arm 12 which is adapted to sense the presence or absence of a supported record, in the course of a record-changing cycle. For this purpose, the inclined portion 33 of the slide 34 in such that it raises the rod 30 and lifts the tone-arm to the extent where its head portion 71, as seen in Figure 3, reaches a normal uppermost position which is above the record-supporting shoulder 27 of the spindle 11 and, therefore, above the level of the record resting directly on said shoulder, this level being represented by the line L—L in Figure 3.

When a record is present on said supporting shoulder, said head portion of the tone-arm, as is illustrated in Figure 2, comes in contact with the underside of said record and is prevented from further upward displacement. As a result, the heel portion 72 of said tone-arm is lifted due to the fulcrum action which is produced by engagement of the extension 32 of the tone-arm with the platform 31 of the rod 30, as the latter continues to climb up the inclined portion of the slide 34 during continuation of its advancing movement. The lifting motion of the tone-arm heel portion draws the shaft 21 upwardly so that the lower end portion 22 thereof is lifted sufficiently to allow the member 61 which is moving with the slide to pass freely beneath said end portion. Accordingly, during a complete record-changing operation, with a record present on the supporting shoulder of the spindle, the slide 34, arm 59, link 60 and member 61 move forward and backward in unison without changing their normally related position illustrated in Figures 1 and 2. In this operation, the switch actuator 58 remains undisturbed since the slot in the portion 65 of the link 60 allows said link to slide with respect to said actuator.

In order to provide for unimpeded horizontal swinging movements of the tone-arm following its lifting and prior to its lowering to start the playing of a newly dropped record, the slide is constructed with a step-down portion 73 which, as is represented in broken lines in Figure 2, allows the rod 30 and its platform 31 to descend sufficiently to lower the tone-arm so that its head portion 71 drops slightly, to a level below the record supporting shoulder 27 and, consequently, below the record supported directly on said shoulder. Because of this slight drop, said head portion clears the supported records when the tone-arm is swung outwardly or inwardly in the manner hereinabove described.

Of course, the descent of the rod 30 and its platform 31 normally acts to allow the tone-arm shaft 21 to move downwardly. However, because of the leverage condition which exists between the tone-arm and its lifting rod during this portion of the record-changing cycle, the dropping of said tone-arm shaft is so slight that it does not interfere with the progressive forward movement of the member 61. Moreover, in the arrangement shown, the member 61 passes beneath the end 22 of the shaft 21 before the above mentioned action occurs so that this lowering of said shaft is of no detrimental consequence. It will be understood that during the return motion or retraction of the slide 34, the tone-arm 12 will be lifted when the rod 30 leaves the aforesaid step-down portion. However, this does not occur until the tone-arm has moved to starting position and the head portion 71 of said tone-arm is under the record on the spindle shoulder 27, so that this action is also of no serious consequence.

During the record-changing cycle which immediately follows the playing of the last record, that is when no record remains on the supporting shoulder 27 of the spindle 11, the tone-arm is free to swing upwardly to its uppermost position in the manner previously described and as illustrated in full lines in Figure 3. Thus, the lower end portion 22 of the tone-arm shaft 21 remains in its lowered normal position and presents a barrier to the advancing member 61. This barrier prevents said member from further progressive forward movement while the slide 34 continues to the end of its forward stroke, the movement of the slide with respect to the member 61 being possible because of the elongated slot 70 which receives the extension 69 of said member. During this movement of the slide 34, the arm 59 being connected to said slide tends to follow the latter but is prevented to do so by said member. Accordingly, the arm 59 is caused to swing about its pivot 62, thus displacing the link 60 to the position shown in full lines in Figure 3. It is pointed out that in moving to this position, the link 60 does not disturb the switch actuator 58 due to the provision of the elongated slot 66 in the portion 65 of said link, so that the phonograph motor continues to operate and returns the cycling cam 26 and slide 34 to their inactive position. However, when the arm 59 and link 60 move with said return movement of the slide 34, from the position represented in full lines to the position represented in broken lines in Figure 3, the portion 65 of said link engages the projection 67 of the switch actuator 58 and pivots the latter to "Off" position, thus terminating the operation of the phonograph. It will be apparent that when the parts are in the position shown in broken lines in Figure 3 and the switch actuator is manually moved from "Off" to "On" position, the link 60 and the arm 59 are returned to the original positions shown in Figure 1 so that the phonograph may again function automatically in the manner above stated.

From the foregoing description it will be appreciated that the invention effectively insures automatic shut-off of a phonograph, when the last record has been played, without necessitating undue complications in the structure of the record-changing mechanism. It will particularly be recognized that the invention in its broader aspect, makes it possible to construct a phonograph so that it can readily be rendered fully automatic by the incorporation of an automatically operated final shut-off arrangement which employs a simple linkage system and utilizes a tone-arm in a novel manner to control the function of said shut-off arrangement.

What I claim is:

In a record-changing phonograph of the kind in which records to be played are supported at a predetermined level above a turntable and dropped successively to playing position on the turntable, and in which a driving motor is controlled by a switching device operable to start and to stop the phonograph, the combination comprising a tone-arm movable into and out of playing engagement with a record in said playing position, cycling mechanism adapted to be driven by the motor and to move said tone-arm, said mechanism including means for so lifting the tone-arm that a portion thereof is raised to an uppermost position above said predetermined level inside the diameter of a record to be played and at the beginning of the change cycle, in the absence of a record at said level, a mechanical system coupled to the switching device and connected with said cycling mechanism to move therewith, means operated by the tone-arm in its uppermost position, whereby said system is shifted by said cycling mechanism from an inactive position to actuate said device to stop the phonograph, and means whereby said last mentioned means is prevented from shifting said system when said portion of the tone-arm is prevented from reaching its said uppermost position by a record supported at said predetermined level.

References Cited in the file of this patent

UNITED STATES PATENTS

| | | |
|---|---|---|
| 2,333,414 | De Tar | Nov. 2, 1943 |
| 2,509,811 | Dale | May 30, 1950 |
| 2,628,843 | Comstock | Feb. 17, 1953 |
| 2,684,248 | Jahncke | July 20, 1954 |
| 2,818,263 | Dale | Dec. 31, 1957 |

FOREIGN PATENTS

| | | |
|---|---|---|
| 1,060,075 | France | Mar. 30, 1954 |
| 110,392 | Sweden | Apr. 18, 1944 |
| 549,635 | Great Britain | Dec. 1, 1942 |